United States Patent [19]
Pocock et al.

[11] 3,819,476
[45] June 25, 1974

[54] INDUSTRIAL TECHNIQUE

[75] Inventors: Frederick J. Pocock, Louisville; William G. Leedy, Alliance, both of Ohio

[73] Assignee: The Babcock & Wilcox Company, New York, N.Y.

[22] Filed: Sept. 1, 1971

[21] Appl. No.: 177,063

[52] U.S. Cl.................................. 176/37, 176/38
[51] Int. Cl................................................ G21c 9/00
[58] Field of Search.............. 176/37, 38, 46, 92 R; 252/387

[56] References Cited
UNITED STATES PATENTS

| | | | |
|---|---|---|---|
| 2,907,689 | 10/1959 | Kidder et al. | 176/38 X |
| 3,158,546 | 11/1964 | Cordova | 176/37 |
| 3,171,789 | 3/1965 | Wanklyn et al. | 176/38 |
| 3,379,613 | 4/1968 | Tagami et al. | 176/38 X |
| 3,528,884 | 9/1970 | Collier et al. | 176/38 X |
| 3,630,942 | 12/1971 | Soldano et al. | 176/37 |
| 3,655,582 | 4/1972 | Levittown et al. | 252/387 |

FOREIGN PATENTS OR APPLICATIONS

| | | | |
|---|---|---|---|
| 909,193 | 10/1962 | Great Britain | 176/38 |

OTHER PUBLICATIONS
"Corrosion Handbook," Herbert H. Ohlig, pp. 16, 915.
"Metallic Corrosion Inhibitors," I. N. Putiloug et al., pp. 124, 125.
"Corrosion," L. L. Shreir. p. 420.
"Corrosion Engineering," Fontana/Green, p. 200.

Primary Examiner—Harvey E. Behrend
Attorney, Agent, or Firm—J. M. Maguire, Esq.; J. P. Sinnott, Esq.

[57] ABSTRACT

In an illustrative embodiment of the invention, approximately 0.1 percent by weight of sodium silicate is added to an aqueous radioiodine absorbing and decay heat removing spray mixture for discharge within a nuclear reactor containment building.

The radioactive decontamination fluid preferably includes 1 percent by weight of sodium thiosulfate, 1.22 percent by weight of boric acid and 0.528 percent by weight of sodium hydroxide in a water solution. The added sodium silicate allows less expensive aluminum components to be used within the containment building because it inhibits a corrosive chemical reaction between the aluminum and the sodium hydroxide. Without the inhibitor, the aluminum-hydroxide reaction would lead to a potentially explosive mixture of hydrogen and oxygen within the containment building.

3 Claims, 1 Drawing Figure

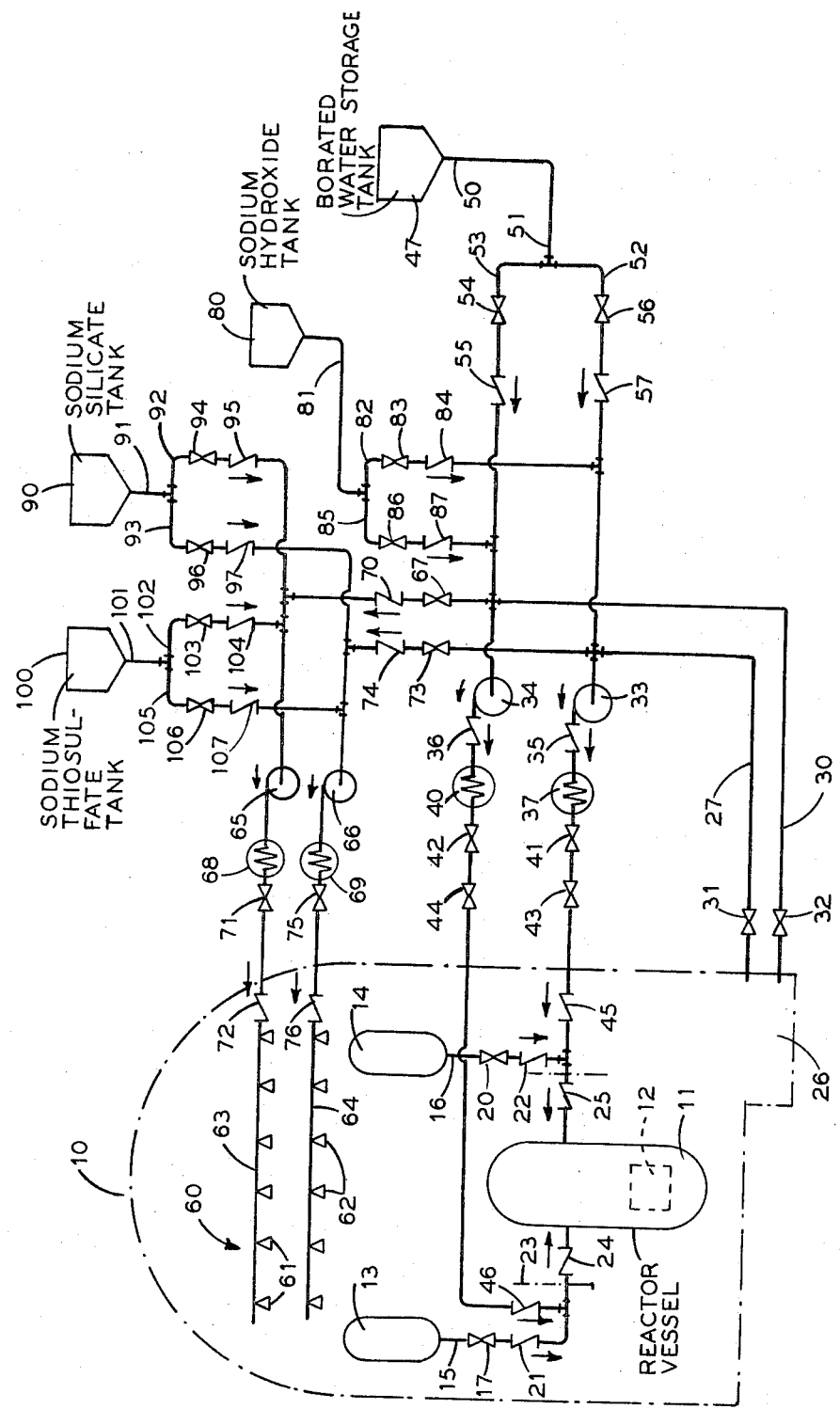

INDUSTRIAL TECHNIQUE

BACKGROUND OF THE INVENTION

1. Field of the Invention

This invention relates to engineered safeguards for nuclear reactors, and more particularly to a pressure and temperature reducing spray that absorbs radioiodine from the environment within a nuclear reactor containment building, and the like.

2. Description of the Prior Art

Nuclear reactors for power generation, as well as for plutonium production, research, and other purposes, usually have a charge of fissionable uranium that is assembled in one or more groups of rods which are supported within a reactor vessel. This array of fuel rods often is referred to as the reactor core. The structural integrity of the fissionable material within the individual fuel rods, moreover, frequently is provided by a peripheral "cladding" of zirconium alloy, stainless steel, or other suitable material. Heat, generated by the neutron induced fission process within the nuclear fuel is removed, in the illustrative case of a pressurized water reactor, by the flow of high pressure primary coolant water past the individual rods. The primary coolant absorbs heat from the rods, and it is this heat that is converted into useful work through conventional means, e.g., electrical power.

Because of public health and safety, as well as the large capital investment that a nuclear reactor represents, considerable thought has been given to the characteristics of likely accidents and to techniques for coping with the effects of these potential accidents. In this connection, a "loss of coolant accident" has frequently been postulated, in which it is assumed for safety evaluation purposes that the reactor core has lost its primary coolant fluid. It is believed that an accident of this sort could lead to an abrupt increase in fuel rod temperature and to a rupture in the fuel rod cladding.

A consequence of this analysis is the installation of reactor core flooding tanks to inundate the core with "borated" water. The water, of course, establishes an emergency cooling medium for the core. The boron in solution, moreover, typically provided by a 1.22 percent by weight addition of boric acid ($H_3BO_3$), absorbs neutrons within the core and thereby reduces the reactor power level. The reactor core nevertheless will continue to generate "decay heat," primarily as a consequence of the radioactive decay of the fission products that accumulate in the fuel. Thus, the borated water must continue to be circulated for a substantial period of time after the loss of coolant in order to dissipate this decay heat.

In these circumstances, a fuel rod cladding rupture, if it occurs, is almost certain to discharge radioactive fission products into the atmosphere around the reactor vessel. Studies have indicated, for example, that the fission product inventory in the core of a typical 1,000 megawatt (electric) power plant can reach an activity of $1.1 \times 10^{10}$ curies. It further appears that iodine and other halogen elements will account for $7.5 \times 10^8$ curies of this activity. Consequently, to reduce this important source of radioactive contamination in the event of an accidental discharge, techniques have been devised for absorbing the iodine and iodine compounds, of which methyl iodide ($Ch_3I$) is typical, from the reactor vessel environment.

Toward this end, reactors often are housed in a "containment" building that is designed to seal the reactor from the atmosphere outside of the structure, should an accident occur. Sealing the reactor in this manner confines the spread of radioactive fission products to the immediate volume surrounding the reactor vessel. Because it is likely, in a loss of coolant accident, that the containment building will be subjected to live steam at superatmospheric pressures, cold water fog or spray systems often are installed to cool and condense the steam within the building, and in this way to reduce the steam pressure and preserve the air-tight integrity of the containment system.

Chemical solutions also have been added to the spray to further aid in decontamination and iodine absorption. One of the more effective iodine absorbers is a mixture in the borated spray water of 1 percent by weight of sodium thiosulfate ($Na_2S_2O_3$). When exposed to radiation or high temperature, however, the acidic nature of the borated water tends to degrade the quality of the sodium thiosulfate in the solution, producing a sulfur precipitate and reducing the iodine absorption efficiency (or equivalence) of the fluid. To overcome this problem, and to provide a more stable sodium thiosulfate solution, sodium hydroxide (NaOH) has been added to the spray in order to convert the acidic liquid into a basic solution with a pH of about 9.5. In this connection the pH value provides some measure of the acidic or basic nature of a fluid. Neutral solutions have a pH of 7; those that are acid, a pH less than 7; those that are alkaline, a pH greater than 7.

The chemcial reactivity of sodium hydroxide and aluminum is quite great, and results in the evolution of hydrogen gas. Thus, to obtain the advantage of an efficient radioiodine decontaminant, aluminum equipment and structural components are excluded from the containment building in order to prevent required safety apparatus from being destroyed, or hydrogen gas from accumulating within the containment building in an explosive concentration.

The economic and engineering penalty for this aluminum exclusion is quite severe. For instance, in some applications materials that are more expensive and less efficient than aluminum, of which stainless steel is typical, must be used throughout the containment building. Illustratively, less thermally effective and more costly stainless steel reflective insulation has been used in containment buildings in order to circumvent this potential aluminum corrosion difficulty. To obtain some quantitative appreciation for the magnitude of this problem, the exposed reflective insulation surface area for a commercial nuclear reactor frequently exceeds 200,000 square feet.

Accordingly, a need exists to combine the advantages of a stable sodium thiosulfate spray solution with aluminum containment building equipment and structural components.

Two approaches have been taken to solve this problem. An intensive search has been carried out to identify substances that not only have a suitable affinity for iodine and iodine compounds, but also are chemically compatible with more desirable materials for containment building interiors. This line of inquiry has led to the identification of a number of compounds all of which seem to exhibit some objectionable feature. Hydrazine ($N_2H_4$), for instance, is an excellent iodine and iodide absorber. It is, however, characterized by unacceptable radiation and temperature instabilities. Hydrogen gas absorption apparatus for reducing the explosion potential within the containment building also has been suggested. But equipment of this sort is costly and may be subject to other practical disadvantages.

SUMMARY OF THE INVENTION

In accordance with the invention, these problems that have characterized the prior art are overcome through the addition of a suitable aluminum corrosion inhibitor to the spray solution.

It has been experimentally demonstrated, for example, that the addition of less than 0.1 percent by weight of sodium silicate ($Na_2SiO_3$), or water glass, to the spray solution reduces aluminum corrosion by more than 99 percent. Accordingly, in a typical embodiment of the invention, a spray solution that is composed by weight of 1 percent sodium thiosulfate, 1.22 percent boric acid, 0.528 percent sodium hydroxide and 0.1 percent sodium silicate will allow aluminum to be used within the containment building in those applications for which it is preferred.

Other aluminum corrosion inhibitors can be substituted for the above mentioned sodium silicate. The salient feature of these inhibitors being the efficiency with which they will prevent aluminum corrosion in a basic solution without seriously degrading the iodine absorption equivalence of the dissolved sodium thiosulfate.

More particularly, one embodiment of the invention includes a nuclear reactor pressure vessel that has a core of fertile material. At least one reactor core flooding tank is connected to discharge borated water into the core during a loss of coolant accident.

In order to dissipate decay heat after the initial core flooding, pumps recirculate the borated water from the core through coolers which, in turn, discharge the heat to the atmosphere or to some other appropriate heat sink. The pressure reducing spray also is connected to the borated water recirculation system.

Spray pumps draw borated water from the recirculation system and mix this water with a sodium hydroxide solution to change the acidic recirculation fluid to a basic pH of about 9.5. This sodium hydroxide is, moreover, discharged from a supply within a storage tank that is connected to the spray system.

The cool, basic mixture of boric acid and sodium hydroxide is combined in the spray system conduits with a suitable concentration of sodium thiosulfate to provide the necessary iodine absorption capability.

In accordance with a feature of the invention, an aqueous solution of sodium silicate, or water glass, also is mixed with the spray liquid in a concentration of about 0.1 percent by weight, and preferably 0.075 percent by weight, to inhibit aluminum corrosion in the containment building. The reactor building spray pumps discharge the entire mixture into the containment building through an array of fog or spray nozzles that are located near the roof. The spray tends to condense the steam in the atmosphere and prevent rupturing the air-tight integrity of the containment building by reducing the internal building pressure. The sodium thiosulfate in the spray moreover, absorbs iodine and iodide compounds from the steam-air mixture. This condensate ultimately drains to a low point or an emergency sump in the reactor building structure from which the decay heat removal pumps and the reactor building spray pumps take suction in order to recirculate the fluid through the reactor core and the spray nozzles. This process is continued until conditions within the containment building have become sufficiently stabilized and safe to enable other decontamination and repair procedures to go forward.

For a more detailed understanding of the present invention, reference is had to the following description taken in connection with the accompanying drawing, the scope of the invention being pointed out in the appended claims.

DESCRIPTION OF THE DRAWING

The sole FIGURE of the drawing shows a schematic diagram of a typical reactor building spray system in accordance with features of the invention.

DESCRIPTION OF THE PREFERED EMBODIMENTS

For more complete appreciation of the invention, attention is invited to the accompanying FIGURE of the drawing which shows a reactor containment building 10. Illustratively, the building 10 is constructed of reinforced concrete and is lined with an air-tight membrane of stainless steel in order to prevent radioactive fission products from escaping to the atmosphere in the unlikely event of an accidental discharge.

The reactor building 10 is stressed to withstand a limited amount of internal superatmospheric steam pressure. The steam is produced in accordance with the terms of the postulated loss of coolant accident, through the discharge of hot, highly pressurized water from a reactor vessel 11 into air at atmospheric pressure within the building 10. In these conditions, the highly pressurized water within the vessel 11 flashes into steam.

As hereinbefore mentioned, a reactor core 12 within the vessel 11 is comprised of one or more groups of individual nuclear fuel rods (not shown). The heat generated through neutron reactions in the fuel within these rods is transferred to a pressurized primary coolant water which, in turn, maintains the fuel rod temperature within acceptable limits.

In the assumed loss of coolant accident, a rupture or leak in the primary coolant system will cause steam to escape into the air space within the building 10. The steam will produce an apparent increase in the internal pressure to which the building 10 is subject. As this apparent pressure increses, for example, to 30 pounds per square inch gauge (psig), a pressure sensor (not shown) automatically acts to flood the core 12 with borated water from core flooding tanks 13 and 14. The water with which these tanks are charged flows through conduits 15 and 16, respectively, past associated gate valves 17 and 20 and swing check valves 21 and 22. The conduits 15 and 16 then pass through penetrations in a biological radiation shield 23 and respective swing check valves 24 and 25 within the shield in 23 before discharging into the vessel 11. Gravity and nitrogen gas under a sufficiently high pressure within the tanks 13 and 14 should force the borated water into the core 12 and thereby cool the fuel elements to a structurally acceptable temperature.

The borated water lowers the reactor power level because boron has a substantially higher probability for absorbing neutrons that are in thermal equilibrium with the immediate environment than any other element that is present within the core 12. Thus, the boron, by absorbing an inordinate number of neutrons, prevents the "chain" of neutron-fission reactions from going forward and propagating itself. In this way the boron acts essentially as a "poison" that tends to deactivate the reactor and thereby reduce its power output. Accordingly, flooding should cause the power level of the reactor core to undergo an immediate decrease to some significantly lower level.

The decay process that characterizes most of the fission products which accumulate within the reactor core 12 during power operation, however, continues to generate substantial amounts of heat even though the boron essentially terminated the neutron induced fission reactions. This decay heat, because it is controlled by the half-lives of the fission products, is liberated at an ever-decreasing rate for a substantial period of time after the boron has all but ended the neutron-fission activity within the core 12.

To dissipate this decay heat, a system is provided in which spray liquid that will be described subsequently in more complete detail, steam condensate, and borated water that leaked, for example, from a rupture in the primary coolant system are recirculated. These fluids accumulate in a reactor building low point, or emergency sump 26. The fluids then are pumped through conduits 27 and 30 in paths that include, respectively, gate valves 31 and 32 and inlets to individual decay heat removal pumps 33 and 34. The pumps each discharge this fluid through respective swing check valves 35 and 36 in the associated conduits 27 and 30. The fluid in the conduit 27 flows through a decay heat cooler 37 where it gives up heat to reach a temperature of about 30° C. This cooled liquid is returned to the conduit 16 and the reactor core 12 through a path that includes a globe valve 41, a gate valve 43 and a swing check valve 45. In a similar manner, the fluid in the conduit 30 flows from the discharge outlet of the pump 34, through decay heat cooler 40, a globe valve 42, a gate valve 44 and a swing check valve 46 to the conduit 15 and the reactor core 12.

Because it is likely that recirculation will have to continue for a relatively long time, a borated water storage tank 47 is provided outside of the reactor building 10 to provide, among other things, a source of makeup fluid that will accommodate losses from the system. In this connection, water that contains a 1.22 percent by weight concentration of boric acid is drawn from the tank 47 through a conduit 50. The conduit 50 terminates in a tee 51 which divides the fluid from the tank 47 between conduits 52 and 53. The conduits 52 and 53 are coupled to the inlets of the respective decay heat pumps 33 and 34. In the conduit 53, the make-up borated water flows past a gate valve 54 and a swing check valve 55. Make-up borated water in the conduit 52 also must flow past a gate valve 56 and a swing check valve 57 to the inlet for the centrifugal pump 33.

It will be recalled that it was assumed in the loss of coolant accident that the pressurized water flashed into steam on escape from the primary coolant system (not shown). A spray system 60 is provided to prevent the steam pressure from causing a rupture that would destroy the air-tight integrity of the containment building 10. The spray system 60 discharges a shower or fog of relatively cool water at, for instance, a temperature of 30° C., into the assumed steam and air filled atmosphere within the reactor building 10. The steam will condense and mix with the spray and flow to the emergency sump 26. Condensing the steam in the foregoing manner necessarily reduces the pressure that is applied to the interior of the containment building 10.

More specifically, sets of spray nozzles 61 and 62, respectively, that are associated with individual conduits 63 and 64 near the top of the reactor building 10 discharge the cooling liquid into the building 10. Spray pressure is provided by a reactor spray pump 65 coupled to the conduit 63 and a reactor building spray pump 66 that is connected to the conduit 64. The pump 65, for example, takes suction from the sump conduit 30 and the borated water storage tank conduit 53. The liquids at the junction between the conduits 30 and 53 flows into the spray conduit 63 through a path that includes a gate valve 67 and a swing check valve 70 to the inlet of the pump 65. The pump 65 discharges the fluid through a path that includes a cooler 68, and a globe valve 71 outside the building 10, through a penetration in the containment structure and past a butterfly valve 72 within the building 10 to the nozzles 61. In a similar manner, the reactor building spray pump 66 takes suction from the sump conduit 27 and from the storage tank conduit 52. The fluid flows past a gate valve 73 and a swing check valve 74 to the inlet of the pump 66. The pump 66 discharges the liquid at a higher pressure into the conduit 64. The pressurized spray fluid in the conduit 64 flows past a cooler 69, a globe valve 75 and a butterfly valve 76, which also is situated within the reactor building 10, to the spray nozzles 62.

Within the spray system the borated water in the storage tank 47 is mixed with a sodium hydroxide solution that is stored in a tank 80 in order to convert the boric acid solution into a fluid that has a pH value of about 9.5. The sodium hydroxide in the tank 80 is metered into the borated water through an automatic control (not shown) that responds to an observed pH value by regulating the sodium hydroxide flow to maintain the desired 9.5pH. Alternatively, manual control or the like also can be used to maintain a weight concentration of 0.528 percent sodium hydroxide in the mixture. As shown in the drawing, the appropriate amount of sodium hydroxide is extracted from the tank 80 through a conduit 81 to a tee which splits the solution into a flow line 82 that is connected through a gate valve 83 and a swing check valve 84 to the conduit 52. In a similar manner, the balance of the sodium hydroxide solution that arrived at the tee is carried through a flow line 85 past a gate valve 86 and a swing check valve 87 to the flow conduit 53.

In accordance with a characteristic feature of the invention, a sodium silicate solution is metered from a storage tank 90 into the building spray conduits 63 and 64 through a path that includes a conduit 91, a tee that splits the flow between a flow line 92 which connects the water glass solution to the conduit 63, and another flow line 93 which is coupled to the reactor building spray conduit 64.

The flow line 92 is selectively interrupted by a gate valve 94 and a swing check valve 95. Similarly, the flow line 93 is controlled by a gate valve 96 and a swing check valve 97 interposed between the tank 90 and the inlet to the spray pump 66. Sodium silicate from the tank 90 preferably is added to the basic sodium hydroxide-boric acid and water mixture in an amount that contributes about 0.075 percent by weight to the entire fluid. This metering can be carried out automatically, or it can be accomplished manually by observing the chemical composition of the spray and appropriately adjusting the amount of sodium silicate that is added to the recirculated fluid to achieve the desired proportions.

In a similar manner, one percent by weight of sodium thiosulfate is added to the solution from a sodium thiosulfate storage tank 100 through a discharge conduit 101 that connects the solution to a flow dividing tee. The tee divides the sodium thiosulfate solution between a flow line 102 that is connected to the spray conduit 63 through a gate valve 103, and a swing check valve 104, and a flow line 105 that is coupled to the building spray conduit 64 through a gate valve 106 and a swing check valve 107. It has been found, moreover, that some sodium hydroxide should be added to the sodium thiosulfate solution during storage to keep the pH of the stored sodium thiosulfate at about 10.5. Prior to reactor testing or power operation all of the storage tanks for the spray system are charged with the proper and proportionate amounts of water and reagents, as described above, to provide the desired chemical concentrations in the recirculating liquid when all of the stored fluids are fully mixed.

In operation, a postulated loss of coolant accident could occur as a result of a rupture in the reactor vessel 11. In this situation, water under extremely high pressure, e.g., on the order of 2,000 pounds per square inch, will escape into the atmosphere within reactor building 10. In these conditions, the pressurized water will almost immediately flash into steam and fill the reactor building 10. A pressure sensor (not shown) within the containment building 10, is set to respond to an increase in atmospheric pressure of, for instance 30 psig, by automatically sounding an alarm and insuring that the building 10 is sealed from the outside environment. The sensor also opens the gate valves 17 and 20 that are associated with the core flooding tanks 13 and 14, respectively in order to discharge the borated water into the core 12. The flooding should begin to cool the core and lower the reactor power level through large-scale thermal neutron absorptions within the boron in the flooding solution.

This borated water also will tend to escape from the reactor vessel 11 in the same way that the primary coolant escaped. To dissipate the steam pressure within the building 10, moreover, appropriate valves are opened and the building spray pumps 65 and 66 are activated in order to draw cool fluid at about 30°C from the sump 26 within the building 10 and the borated water storage tank 47 that is located outside of the building. An adequate volume of spray solution at 30°C will condense the steam in the atmosphere and lower the pressure within the containment building.

When the reactor building spray pumps 65 and 66 are activated, sodium hydroxide from the tank 80, sodium silicate from the tank 90, and sodium thiosulfate from the tank 100 also are added to the borated water solution that is being pumped to the spray nozzles 61 and 62. In the embodiment of the invention shown, these reagents are combined with the boric acid solution in the preferred weight percentages because the correct relative quantities of reagents and water are stored in the tanks to produce this result while also providing an adequate volume of cooling water for decay heat removal purposes. The entire mixture, when sprayed into the building 10 as described, absorbed much of the iodine and iodine compounds that may have been discharged into the building atmosphere as a consequence of a fuel rod failure. The inhibitor in the basic solution allows the spray to drench the interior of the containment building without producing widespread aluminum corrosion.

As shown in the sole FIGURE of the drawing, the spray solution and the steam condensate drain to the low point or sump 26 within the containment building 10. The liquid in the emergency sump 26 is drawn through conduits 27 and 30 in response to suction from the decay heat pumps 33 and 34 and the reactor building spray pumps 65 and 66. This liquid is circulated either through the reactor core 12 by way of the decay heat coolers 37 and 40 or recirculated through the building 10 by way of the coolers 68 and 69 and the spray nozzles 61 and 62. Preferably this circulation is continued until conditions within the containment building 10 have become so stabilized that further decontamination and repair procedures can be carried out.

During the time of recirculation, it is possible that the solution efficiency can decline by becoming more dilute, or the like. Accordingly, samples of the solution can be extracted from time-to-time and analyzed for chemical content. If the solution does not satisfy a standard of chemical efficiency the recirculating fluid can be brought to its proper concentration through the addition of appropriate reagents.

What is claimed is:

1. A method for preparing a nuclear reactor engineered safeguard for a reactor system having a reactor core comprising the steps of charging a core flooding tank with a solution of water and about 1.22 percent by weight of boric acid, charging a borated water storage tank with a solution of water and about 1.22 percent by weight of boric acid, providing means for flowing said borated water through said reactor core, charging an hydroxide storage tank with an hydroxide solution, charging a sodium thiosulfate storage tank with a sodium thiosulfate solution characterized by a high iodine absorption efficiency, charging an aluminum corrosion inhibitor storage tank with an aluminum corrosion inhibitor solution compatible with the iodine absorption efficiency of said sodium thiosulfate solution, and installing means for mixing said solutions of hydroxide, sodium thiosulfate, and aluminum corrosion inhibitor with said borated water after said borated water has flowed through said reactor core to provide an engineered safeguard spray having a pH of about 9.5 for the nuclear reactor.

2. A method according to claim 1, wherein said aluminum corrosion inhibitor solution comprises a water solution of sodium silicate.

3. A method according to claim 1, wherein said sodium thiosulfate solution storage tank charging step further comprises adding a base to said charge to establish a solution pH of about 10.5.

* * * * *